June 28, 1960  C. S. WALKER  2,943,305
PROTECTIVE CIRCUITRY FOR RECTIFIERS
Filed April 8, 1957  2 Sheets-Sheet 1

Inventor:
Charles S. Walker
by James E. Mrose
His Attorney

Inventor:
Charles S. Walker
by James E. Moore
His Attorney

United States Patent Office 2,943,305
Patented June 28, 1960

2,943,305

PROTECTIVE CIRCUITRY FOR RECTIFIERS

Charles S. Walker, Marblehead, Mass., assignor to General Electric Company, a corporation of New York Filed Apr. 8, 1957, Ser. No. 651,529

3 Claims. (Cl. 340—222)

The present invention relates to current rectification apparatus and, more particularly, to improved current rectifier circuitry wherein development of breakdown conditions is detected and announced and the equipment is de-energized in a timely manner to preclude damage.

In the provision of high levels of D.-C. power, as for industrial purposes, the usual A.-C. supplies excite transformer, rectifier, filter and control circuitry involved in the conversion to regulated unidirectional power. Such components may be grouped in a single complex console unit serving as the D.-C. supply, and these units commonly require protection against untimely failures and costly component damage. While inadvertent short-circuiting and chance component failures may account for certain breakdowns, perhaps the principal causative factor is excessive temperature. As safe temperature limits are exceeded, the electrical outputs may be greatly disturbed, insulations impaired, and semiconductor rectifier cells destroyed. The latter tendency is of critical importance where the newer minature semiconductor cells of germanium or silicon are employed, inasmuch as these rectifier cells possess only small thermal capacities in relation to their electrical power ratings. Forced cooling improves heat dissipation characteristics of the cells, although failure or inability to handle sudden thermal overloads quickly results in rectifier cell destruction unless protective devices function to prevent such occurrences.

Heretofore, a limited degree of protection for equipments of this type has been provided mainly by fuses. Where numerous components are involved, separate protection therefor introduces an undesirably large number of such fuses, each of which must be regularly scanned for faults and replaced if blown. Individual fuses of course cannot be fully tested without destroying their usefulness, and protection usually occurs only after occurrence of a dangerous condition and without anticipation of circumstances likely to develop faults. Further, fuses do not enable ready adjustments for protection under different or varying conditions. In accordance with the present teachings, however, current rectifier equipment is safeguarded against failures without employing fuses and, instead, through combined influences of adjustable temperature-responsive and current-responsive circuits each of which compensates for certain inherent response deficiencies of the other.

Therefore, it is one of the objects of the present invention to provide improved current rectifier apparatus wherein equipment failures are avoided by action of circuitry which announces impending danger conditions and protects against actual occurrence of faults.

A further object is to provide improved rectifier circuitry which may be reset for repeating precise protective control and signalling.

In addition, an object is to provide current rectification equipment wherein coordinated current-responsive and temperature responsive circuits anticipate and safeguard against operational failures.

By way of a summary account of this invention in one of its aspects, I employ a rectifier console including electrical switches, power transformers, capacitors, a plurality of semi-conductor rectifier cells, and motor-driven impellers for the circulation of a coolant about the rectifier cells and other components. In the primary circuit of the power transformers, there is coupled a current-responsive relay circuit in which a first relay triggers continuous excitation of a warning light upon even momentary occurrence of a first high level of primary current which is indicative of impending faults due to excessive currents anywhere in the electrical circuitry. A second relay unit in the current-responsive circuit is adjusted to de-energize the entire primary circuit, and, thereby, to interrupt all operation, when primary currents at or near fault levels appear. At least one of the rectifier cells, preferably that in the position of least favorable cooling and experiencing the highest ambient temperature conditions, is provided with a thermistor embedded therein in proximity with one of its vulnerable soldered junctions, this thermistor being incorporated into a temperature-responsive relay circuit where it functions to control the operation of a half-wave amplistat. The amplistat is caused to deliver excitation current to a sensitive relay until the thermistor resistance becomes critical at a temperature level indicative of an impending cell failure. Thereupon, the sensitive relay actuates associated circuitry which triggers continuous excitation of another warning light and which resets the amplistat to become responsive to a second, and higher, temperature level. When and if this second temperature level is reached, and cell failure would thus become a certainty unless protection occurred, further associated circuitry interrupts the primary circuit excitation and renders the entire apparatus inoperative and safe from component failures. Adjustments are provided for critical responses to various currents and temperatures, and the apparatus may be operated repeatedly without component replacements. The thermally-responsive protective arrangement safeguards the semiconductor rectifier cells from build-up of destructive temperatures, although the thermal lags inherent in the cells are relatively large and the cells and other electrical equipment could be led to ultimate destruction by the failure of rapid response. Such might be the occurrence upon failure of certain cells for other reasons, or upon short-circuiting elsewhere in the system. However, the destructive conditions which are not immediately reflected in elevated temperatures are instead reflected in increased primary current, and the current-responsive relay circuit acts instantly to protect all equipment. It should be recognized, however, that the relatively long-term thermal protective circuitry is nevertheless essential because current response alone would not signal and guard against all thermally-induced faults. For example, what would constitute a safe rectifier cell or primary current under normal forced cooling conditions could nevertheless occasion cell destruction under defective cooling conditions, and only thermal protective arrangements would respond adequately.

The subject matter regarded as my invention is particularly pointed out and distinctly claimed in the concluding portion of this specification. However, both as to organization and mode of operation, and further in relation to objects and advantages thereof, this invention may best be understood through reference to the following description taken in connection with the accompanying drawings, wherein:

Figure 1:
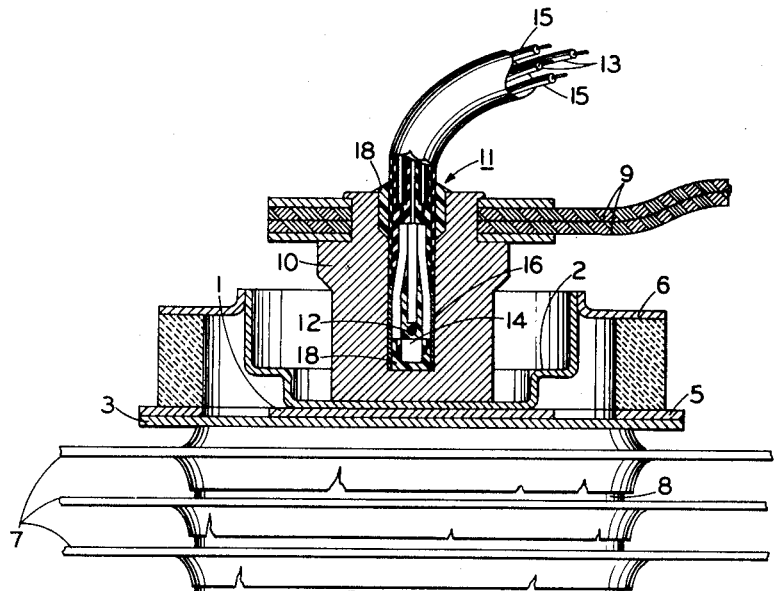
Figure 1 is a partial cross-sectioned view of a germanium rectifier cell incorporation thermal devices for practice of these teachings.

The rectifier cell unit depicted in Figure 1 may be one of a bank of such units employed in the rectification of alternating current outputs of a polyphase power transformer, and it is sensitive to load currents, applied voltages, ambient temperatures, and the effects of forced cooling air. Constructional details are similar to those described in U.S. Patent No. 2,756,374, assigned to the same assignee as that of the present application, it being noted that a semiconductor wafer 1, such as germanium, is soldered to and sandwiched intermediate a cup-shaped top electrode 2 and a base electrode 3. A hollow cylinder 4 of ceramic material has metallized ends soldered to members 5 and 6 which are in turn welded to electrodes 3 and 3, respectively, such that the wafer is hermetically sealed and its electrodes fully insulated from one another. Heat-dissipating fins 7 are in good thermal communication with base electrode 3 and its soldered junction with wafer 1 through the mounting stud 8 affixed to electrode 3, and cooling air which is forced past these fins by a suitable impeller tends to maintain cell temperatures at levels which are not injurious to the semiconductor or to the various seals and junctions of the unit. As has been noted earlier herein, static current rectifiers of this type have tremendous electrical power handling capacities, although this advantage and the advantage of remarkably high efficiency can be effectively utilized only when the associated heat losses are dissipated properly. Electrical bus connections are made through stud 8 and through a braided cable 9 staked to the terminal lug 10 which is soldered to the bottom outside surface of cup-shaped electrode 2. For purposes more fully explained hereinafter, it is important that the thermal conditions of the cell unit be continuously monitored and that control be exercised responsive to these conditions. An optimum locus for such monitoring appears at the vulnerable junction of the wafer 1 with top electrode 2 near the sensitive rectifying barrier, and, accordingly, a small-diameter hole 11 is drilled or otherwise sunk in conductive terminal lug 10 with the bottom thereof near this junction. Two thermally-responsive elements are positioned within this drilled hole: one comprises a miniature thermocouple having a bead-like junction 12 coupled with electrical leads 13; and the other comprises a thermistor 14 coupled with electrical leads 15. In accordance with known practices, the thermistor 14 is preferably made of a molded conductove material having a negative temperature coefficient of resistivity, and the thermocouple junction 12 may involve wires of dissimilar metals known to yield discrete electrical output signals at certain temperatures. Junction 12 and thermistor 14 are insulated from terminal lug 10 by a sleeve 16, and these elements together with the cable 17 for leads 13 and 15 are fixed in position by a suitable insulating cementing compound 18 such as an expoxide casting resin. Thermistor 14 functions to control certain warning indicators and to incapacitate the rectifier system before faults can occur, while thermocouple junction 12 yields outputs which are a measure of temperature and which enable accurate calibration and adjustment of the protective circuitry.

Figure 2:
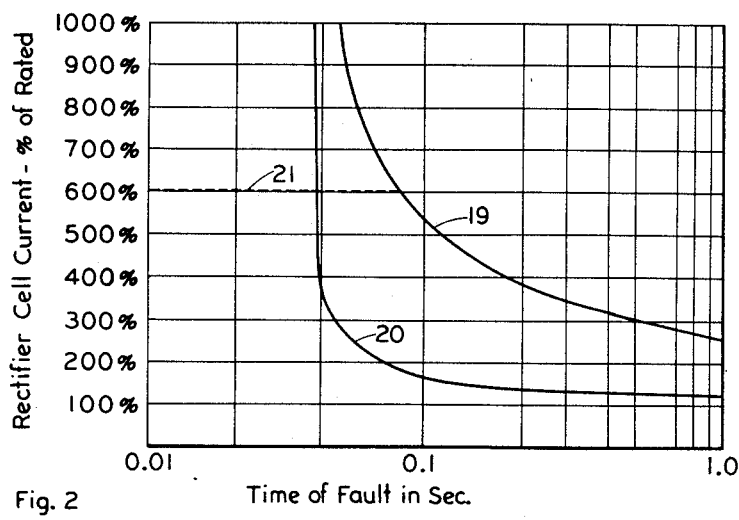
Figure 2 is a plot of current vs. time characteristics which are significant in the protection of rectifier apparatus.

Characteristic curve 19 in Figure 2 represents a critical cell temperature of 65° C. which obtains for various currents in excess of a rated value at various times of fault durations. A family of similar curves may be plotted for other temperature levels, although the 65° C. curve is taken as a representative curve for a typical germanium cell. If the cell temperature is permitted to exceed this level, the peak inverse voltages applied in a typical industrial rectifier circuit can be expected to cause a cell breakdown, and ultimately the junctions and seals may be damaged and the cell operation impaired. It will be noted that the critical temperature may be reached in only a small fraction of a second, and yet a protective thermistor may have a time lag of about 50 seconds. For safe operation, a protective circuit characteristic must be fully anticipatory, as is the representation in curve 20. This latter curve depicts the current vs. time to shutdown characteristics of a current-responsive protective circuit which compensates for the thermal lag deficiencies of thermistor 14. As a practical matter, the maximum overload current which may be experienced in a complete rectifier equipment is limited, as by circuit impedances, to some finite value such as the 600% rated level shown by dashed line 21.

Figure 3:
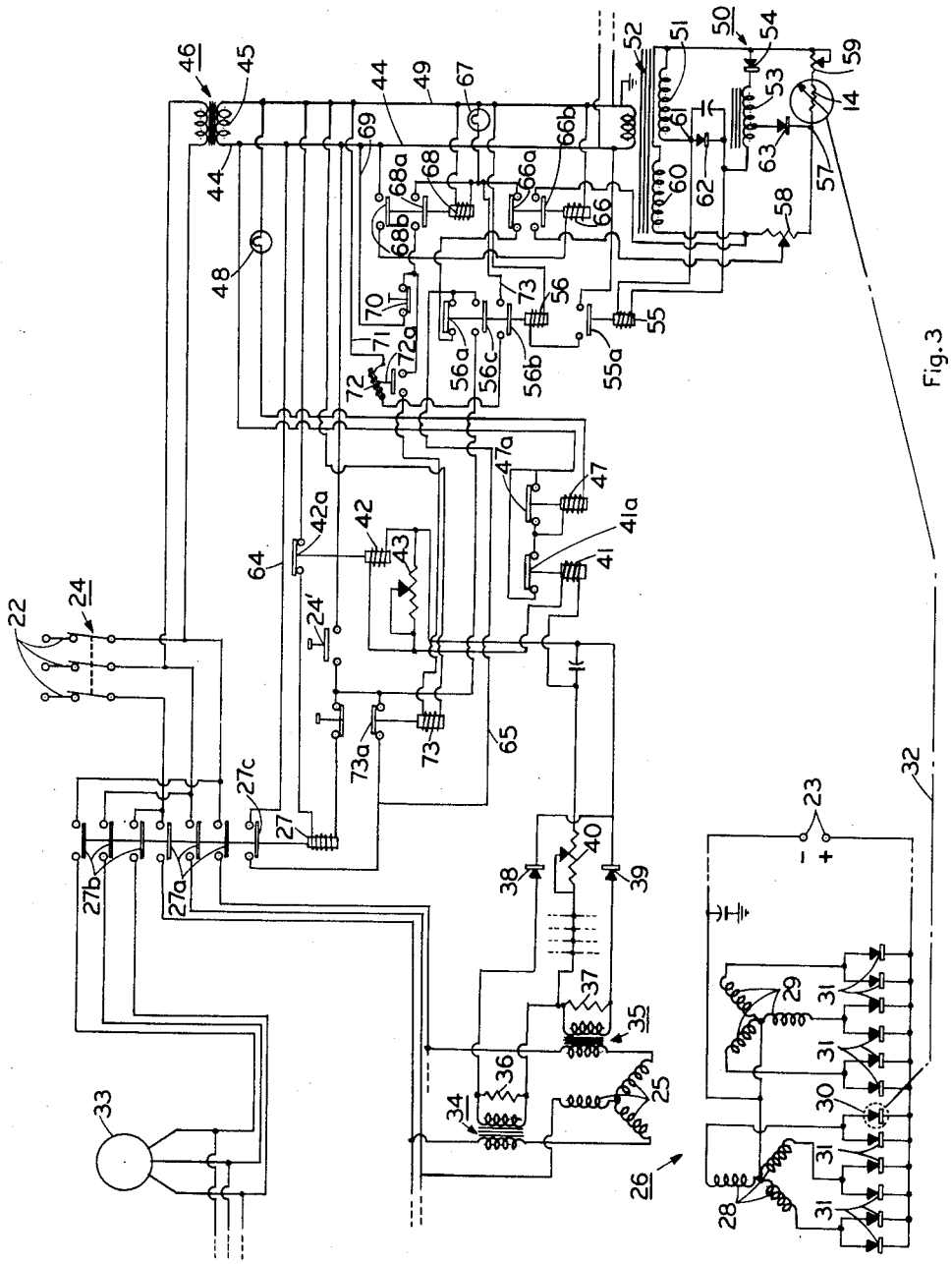
Figure 3 depicts schematically one portion of a protected rectifier system.

With the foregoing cell construction and operating characteristics in mind, reference should next be had to the tected rectifier circuitry of Figure 3 wherein these features are uniquely exploited. All of the equipment there depicted in schematic form is arranged within an enclosure or console, the A.-C. excitation therefore being brought in by way of three-phase supply leads 22 and the D.-C. outputs to desired loads being available via terminals or busses 23. A single stage of rectifier equipment is diagrammed, together with its protective circuitry, although it will be understood that other comparable stages may also be contained within the same enclosure. Closing of a manually-operated switch 24 couples the A.-C. supply terminals 22 with the polyphase primary windings 25 of a main power transformer 26 through the switches 27a actuated to closure by master relay coil 27. The power transformer secondary windings 28 and 29 thus become energized and apply unidirectional electrical output signals to load terminals 23 as the result of the rectifying action of twelve semiconductor rectifier cell units. One of these rectifier cell units, 30, corresponds to that illustrated in Figure 1 in that it is provided with a thermistor 14 and a thermocouple and in that it is so situated in the console that it experiences no more favorable cooling and ambient temperature conditions than the remaining units 31 which are otherwise of similar construction. Thermistor 14 for the selected cell unit 30 is designated as being physically associated therewith by the double-dashed line 32. Cooling air is forced about the rectifier cell units and other components of the assembly by a suitable number of impeller or fan motors, such as motor 33, which are energized by the A.-C. supply through master relay switches 27b closed responsive to closure of manual switch 24.

Of the two cooperating protective circuits for this rectifier assembly, the current-responsive circuit is somewhat less complex. It includes a pair of current transformers, 34 and 35, each serially disposed in a different phase of the three-phase primary excitation for the power transformer 26. The secondary windings of these current transformers are paralleled by resistances 36 and 37, respectively, such that the output voltages thereacross are proportional to the transformer primary line currents. Primary currents in excess of normal or rated values are immediately reflected in increased output voltage from either or both of the transformers 34 and 35 and this is evidence of overload current wherever it originates in the load circuitry. Secondary windings and the paralleled resistances of the two transformers 34 and 35 are serially coupled with rectifiers 38 and 39, respectively, and these combinations are paralleled across the series combination of adjustable resistance 40, warning relay coil 41, and disabling relay coil 42. The latter coil, 42, is shunted by an adjustable resistance 43 which regulates the operating characteristics thereof. Resistances 40 and 43 are set such that only warning relay coil 41 is energized sufficiently to close its normally-open relay switch 41a when transformer primary current exceeds 110% of a normal rated value, this 110% level representing a potential danger and dictating that a warning signal should be displayed. Closure of relay switch 41a, even momentarily, completes a circuit from one line 44 of the secondary 45 of a single-phase transformer 46 through a holding relay coil 47 and through a current warning light 48 to the other secondary output line 49. Holding relay switch 47a, which is normally open, is thus closed and remains closed to preserve the current warning light illuminated until the equipment is shut down and re-set into operation. In some apparatus, it may be desirable to further include a push-button disconnect switch in series with coil 47 such that the warning light may be manually interrupted after a danger condition has been noted by an observer. Should the primary circuit current exceed a still higher level which would cause equipment failures if permitted to exist, as, for example, a current which is 120% of the rated value, the disabling relay coil 42 actuates its normally-closed switch 42a to an opened condition. The exact trip-out level may be set by adjustment of variable resistance 43. Opening of normally-closed switch 42a in this manner breaks the excitation circuit for master relay coil 27 and causes the main power circuit relay switches 27a to disable the rectifier apparatus and prevent damage to the equipment components. Master relay coil 27 had earlier closed the main power circuit switches 27a upon closure of the manual switch 24 and a momentary push-button starting switch 24', this having occurred because of the paralleling of coil 27 across the transformer output lines 44 and 49 first through the switch 24' and then through a closed relay switch 73a. The rapid disabling characteristics of this circuitry responsive to disabling relay coil 42 corresponds to that represented by curve 20 in Figure 2, and it will be observed that there is sufficient anticipation to preclude destruction of semi-conductor rectifier cells by overload currents. In particular, the current-responsive protective circuit just described safeguards against failures due to accidental short-circuiting of the rectifier system output or against the high currents occasioned by failure of one or more rectifier cells.

The temperature-responsive protective circuitry, which is of relatively long-term characteristics when compared to those of the current-responsive circuitry last described, includes the thermistor 14 in a half-wave amplistat circuit designated generally by reference character 50. Amplistat unit 50 receives A.-C. excitation from a secondary winding 51 of a single-phase transformer 52 energized by the output leads 44 and 49 of transformer 46. The amplistat winding is identified by reference character 53 and may be observed to be in series relationship with a rectifier 54 and a relay coil 55 across the output of the excitation secondary winding 51. Under normal operating conditions, the amplistat winding 53 permits unidirectional current to flow through relay coil 55 and maintain its relay switch 55a in a closed condition. This switch closure in turn couples relay coil 56 across excitation lines 44 and 49 whereby the normally-closed switch 56a is opened. No significant signalling or protective action occurs at such times. However, the aforesaid conducting condition of amplistat winding 53 is enabled only when thermistor 14 possesses a certain minimum resistance. When thermistor 14 has at least this certain value of resistance, the voltage appearing at point 57 in the amplistat circuitry, by virtue of drops occurring across resistance 58 and thermistor 14 and resistor 59, which are in series across another secondary winding 60, is in excess of the voltages appearing at point 61, and rectifiers 62 and 63 block flow of any reset current in amplistat winding 53. As the temperature of rectifier cell unit 30 increases to a potentially dangerous level, such as 60° C., the resistance of thermistor 14 decreases to a critical value which reduces the voltage at point 57 to values less than the values of voltage at point 61, and unidirectional current flows through a tapped portion of amplistat winding 53 to provide a flux reset effect and, thereby, to interrupt the flow of unidirectional current through relay coil 55 and amplistat winding 53. Thereupon, relay switch 55a is opened, relay coil 56 becomes de-energized, and relay switch 56a closes. This last closure completes a circuit from excitation line 44 through line 64, the closed master relay switch 27c, line 65, normally-closed relay switch 66a, and to the cooperating excitation lead 49 through both warning lamp 67 and relay coil 68. The desired warning of potentially dangerous temperature is thus signalled by illumination of warning light 67. Excitation of relay coil 68 at the same moment that light 67 was illuminated results in closure of its normally-opened switch 68a, whereby another path for coil 68 and lamp 67 from lead 49 to lead 44 is provided through line 69 and push-button 70. Coil 68 and switch 68a thus function as a holding relay, and lamp 67 continues to signal its warning even though the actuation thereof may have been caused by merely a momentary thermal overload. Push-button 70 permits the operator to interrupt the warning light if this is desired.

Excitation of holding relay coil 68 not only accomplishes a holding operation which maintains the warning lamp illuminated but also simultaneously results in closing the normally-opened relay switch 68b. It will be perceived that switch 68b is in series with a relay coil 66 across the excitation leads 44 and 49. Thereupon, the relay switch 66b is closed and accomplishes a short-circuiting of part of resistance 58 in the amplistat circuitry 50. The effective resistance of resistance 58 is thus very much decreased and the voltage at point 57 is raised to prevent substantial reset current flowing through the tapped portion of amplistat winding 53. Accordingly, amplistat winding 53 again causes unidirectional current to flow through relay coil 55 and to close the switch 55a associated with that relay coil. As switch 55a closes, it again causes excitation of relay coil 56, such that its normally-opened switch 56b is closed and current flows from line 49 through lead 71, heater 72 of bimetal switch 72a, switch 56b, lead 73, and back to line 44 through switch 68a and push-button 70. After a short interval, such as a 5-second interval, the heater 72 causes closing of the bimetal switch 72a, with the result that relay coil 73 is energized from across lines 44 and 49 and opens its normally-closed switch 73a. Meanwhile, relay switch 56c had been closed by the excitation of relay coil 56, and this relay switch preserved excitation of relay coil 27 from across lines 44 and 49. As the temperature of cell 30 increases further, to about 65° C., the thermistor 14 further decreases in resistance and again causes reset current to flow through the amplistat winding 53. The amplistat operation is then cut off, and its relay coil 55 de-energized. Upon this occurrence, switch 55a opens and de-energizes coil 56, with the result that the relay switch 56c opens the circuit to master relay coil 27. Then main circuit switches 27a are opened and the entire apparatus is disabled to preclude the possibility of damage to components.

The exact temperature levels at which thermistor 14 will block amplistat conduction and cause warning lamp 67 to become illuminated or the main circuit switches 27a to open may be regulated by adjustments of the variable resistances 58 and 59 in the control circuit 50. In this connection, the thermocouple element 12 associated with thermistor 14 in rectifier cell unit 30 becomes important. Thermocouple 12 may be coupled with a suitable measuring instrument (not shown) in known ways to indicate temperature and thereby afford a calibration for the control circuit 50.

Thermal delay switch 72a in the temperature-responsive circuitry serves primarily to insure that proper switching sequences occur. Once the push-button 24' has been pressed momentarily in originally starting the equipment, the normally-closed relay switch 73a preserves a current flow through master relay coil 27 until the thermal switch 72a is closed following a predetermined minimum duration of an excess cell temperature. Thereafter, the opening of relay switch 56c upon occurrence of the maximum permitted cell temperature causes full opening of the circuit for master relay coil 27 and the equipment is completely disabled.

The two levels of current and of temperature at which warnings and disablings occur are established within safe limits which may be withstood by the rectifier cells and other components without permanent damage. Thus, after the equipment is shut down to eliminate dangerous or fault conditions, it may be placed back into operation without alteration of the protective circuitry. Other forms of warning devices, such as annunciators and audible alarms may be utilized, and these may continue to function after a fault when their excitation circuitry is independent of the operation of master relay 27, as is the case in the arrangement of Figure 3. Thermistors or other thermal sensing devices may be associated with more than one rectifier cell unit of a bank of such units, if desired.

While my invention has been described in detail in connection with certain preferred embodiments thereof, it will be understood by those skilled in the art that various substitutions and modifications might be made without departure from the true spirit and scope thereof as defined in the accompanying claims.

What I claim as new and desire to secure by Letters Patent of the United States is:

1. In apparatus for the rectification of alternating electrical power including A.-C. supply terminals, a power transformer, at least one semiconductor rectifier, and load circuit connections energized by said transformer through said rectifier, the protective arrangement comprising a pair of electrical switches controlling the coupling and uncoupling of said supply terminals and said power transformer, an over-current electrical annunciator, current-responsive means responsive to currents in said transformer for actuating said over-current annunciator to an announcing condition when said currents exceed a first predetermined value and for actuating one of said switches to uncouple said terminals and transformer when said currents exceed a second predetermined higher value, an over-temperature electrical annunciator, means energized by said supply terminals for maintaining each of said annunciators in an announcing condition whenever it is actuted to said condition, a thermally responsive device disposed proximately with said rectifier and having an electrical characteristic varying with temperatures of said rectifier, an electric circuit including and responsive to said characteristic of said thermally-responsive device for actuating said over-temperature annunciator when the temperature of said device and rectifier exceeds a first predetermined level and for actuating the other of said switches to uncouple said terminals and transformer when the temperature of said device and rectifier exceeds a second predetermined higher level.

2. In apparatus for the rectification of alternating electrical power including A.-C. supply terminals, a power transformer, at least one semiconductor rectifier, and load circuit connections energized by said transformer through said rectifier, the protective arrangement comprising a master relay for coupling and uncoupling said A.-C. supply terminals and said power transformer, means for electrically energizing said master relay to couple said A.-C. terminals with said transformer, an over-current electrical annunciator, first electrical relay means responsive to currents in said transformer for energizing said over-current annunciator and maintaining said annunciator in an actuated condition when said transformer current exceeds a predetermined value, second electrical relay means responsive to currents in said transformer for de-energizing said master relay to uncouple said terminals and transformer when said transformer currents exceed a second predetermined value greater than said first predetermined value, an over-temperature electrical annunciator, a thermally-responsive device disposed in proximity with said rectifier and having electrical characteristics varying with temperature, an electric circuit including said thermally-responsive device and third electrical relay means, said electrical circuit being arranged to energize said third relay means when said thermally-responsive device experiences temperatures below a first predetermined level and to de-energize said third relay means when said device experiences temperatures in excess of said first predetermined level, means operative upon a first de-energizing of said third relay means to energize said over-temperature annunciator and to maintain said over-temperature annunciator in an actuated condition, means operative upon said first de-energizing of said third relay means for restoring energization of said third relay means by said circuit, said circuit further being arranged to de-energize said third relay means when said device experiences temperatures in excess of a second predetermined level higher than said first predetermined level, and means operative upon a second de-energizing of said third relay means to de-energize said master relay and to uncouple said terminals and transformer.

3. In apparatus for the rectification of alternating electrical power including A.-C. supply terminals, a power transformer having primary and secondary windings, a plurality of semi-conductor rectifiers, load circuit connections energized by said transformer secondary windings through said rectifier, and means for forcing coolant past said rectifiers, the protective arrangement comprising a master relay for coupling and uncoupling said A.-C. supply terminals and the primary windings of said transformer, means for electrically energizing said master relay to couple said A.-C. terminals with said primary windings, an over-current electrical annunciator, first electrical relay means responsive to currents in said primary windings for energizing said over-current annunciator and maintaining said annunciator in an actuated condition when said currents exceed a predetermined value, second electrical relay means responsive to said currents for de-energizing said master relay to uncouple said terminals and primary windings when said currents exceed a second predetermined value greater than said first predetermined value, an over-temperature electrical annunciator, a thermistor embedded in an electrode of one of said rectifiers and having resistances varying with temperature, an electric circuit including said thermistor and third electrical relay means, said electrical circuit being arranged to energize said third relay means when said thermistor experiences temperatures below a first predetermined level and to de-energize said third relay means when said thermistor experiences temperatures in excess of said first predetermined level, means operative upon a first de-energizing of said third relay means to energize said over-temperature annunciator and to maintain said over-temperature annunciator in an actuated condition, means operative upon said first de-energizing of said third relay means for restoring energization of said third relay means by said circuit, said circuit further being arranged to de-energize said third relay means when said thermistor experiences temperatures in excess of a second predetermined level higher than said first predetermined level, and means operative upon a second de-energizing of said third relay means to de-energize said master relay and to uncouple said terminals and primary windings.

References Cited in the file of this patent

UNITED STATES PATENTS

| | | |
|---|---|---|
| 1,959,513 | Weyandt | May 22, 1934 |
| 2,259,331 | Vedder | Oct. 14, 1941 |
| 2,315,599 | Cox et al. | Apr. 6, 1943 |
| 2,457,069 | Rauh | Dec. 21, 1948 |
| 2,698,429 | Treanor | Dec. 28, 1954 |
| 2,733,399 | Derr et al. | Jan. 31, 1956 |